United States Patent [19]

Seibert

[11] Patent Number: 4,998,870
[45] Date of Patent: Mar. 12, 1991

[54] MEANS FOR CORE COATING

[75] Inventor: Gerhard Seibert, Baden, Austria

[73] Assignee: Maschinen Gesellschaft m.b.H. Rosendahl, Maria Enzersdorf, Austria

[21] Appl. No.: 224,305

[22] Filed: Jul. 26, 1988

[30] Foreign Application Priority Data

Aug. 12, 1987 [AT] Austria .............................. 2038/87

[51] Int. Cl.⁵ .................. B29C 47/02; B29C 47/06
[52] U.S. Cl. ............................. 425/113; 264/310; 264/245; 264/174; 264/209.2; 425/382.3; 425/463; 425/381; 425/131.1; 425/133.1
[58] Field of Search ............ 425/113, 114, 131.1, 425/133.1, 461, 462, 465, 466, 382.3, 381; 264/169, 75, 176.1, 174, 209.2, 211.23, 245, 463, 172, 310

[56] References Cited

U.S. PATENT DOCUMENTS

| | | | |
|---|---|---|---|
| 2,174,779 | 10/1939 | Delorme | 264/75 |
| 2,521,123 | 9/1950 | Lowrence | 425/113 |
| 2,779,970 | 2/1957 | Stocker | 425/113 |
| 3,020,927 | 6/1974 | Toomajanian | 425/113 |
| 3,143,583 | 8/1964 | Hougwitz | 425/113 |
| 3,649,143 | 3/1972 | Papesh et al. | 425/133.1 |
| 3,924,990 | 12/1975 | Schrenk | 425/131.1 |
| 3,933,760 | 1/1976 | Cameron et al. | 284/209.2 |
| 4,061,461 | 12/1977 | Hessenthaler | 425/133.1 |
| 4,111,630 | 9/1978 | Shiomi et al. | 425/133.1 |
| 4,248,824 | 2/1981 | Hattop | 264/174 |
| 4,280,801 | 7/1981 | Wheeler, Jr. | 425/462 |
| 4,492,549 | 1/1985 | Rasmussen et al. | 425/133.1 |
| 4,548,567 | 10/1985 | Missout | 264/284 |
| 4,761,129 | 8/1988 | Aste et al. | 425/133.1 |
| 4,832,960 | 5/1989 | Compagnon | 264/211.23 |

FOREIGN PATENT DOCUMENTS

| | | | |
|---|---|---|---|
| 179521 | 4/1986 | European Pat. Off. | 425/131.1 |
| 2712970 | 10/1978 | Fed. Rep. of Germany | 425/133.1 |
| 2855607 | 6/1980 | Fed. Rep. of Germany | 425/381 |
| 2921943 | 12/1980 | Fed. Rep. of Germany | . |
| 56-67223 | 6/1981 | Japan | 425/461 |
| 56-155725 | 12/1981 | Japan | 425/462 |
| 1319084 | 6/1987 | U.S.S.R. | 425/133.1 |
| 1429046 | 3/1976 | United Kingdom | 425/381 |
| 2109740 | 6/1983 | United Kingdom | 425/133.1 |

Primary Examiner—Jeffery Thurlow
Assistant Examiner—Mathieu Vargst
Attorney, Agent, or Firm—Nies, Kurz, Bergert & Tamburro

[57] ABSTRACT

Apparatus for the extrusion-coating of a core, especially of an electrical conductor, with a sheathing having at least two layers or strips of different materials or differently colored materials, the apparatus having feed conduits for the plasticized materials and outflow passageways through which the core to be extrusion-coated can pass, the outflow passageways being selectively connectable to the feed conduits via a distributor device. In order to avoid the need for cleaning the conduits of the distributor device, the distributor device is formed by a sleeve (8) which is arranged rotatably between end positions in relation to an outer housing (1) having feed conduits (2, 3) for the plasticized materials. The sleeve also has a number of conduits corresponding to the number of materials to be extruded, to connect feed conduits (2, 3) alternately to the outflow cross-sections (15, 20) for the plasticized materials. The sleeve conduits of the rotatable sleeve terminate on the outside of the sleeve (8) and are mutually offset by the same angular amount as corresponding conduits in a fixed sleeve (5) that surrounds rotatable sleeve (8).

9 Claims, 3 Drawing Sheets

MEANS FOR CORE COATING

BACKGROUND OF THE INVENTION

1. Field of the Invention

The invention relates to an apparatus for the extrusion coating of a core, especially of an electrical conductor, with a sheathing having at least two layers or strips of different or differently colored materials. The apparatus has at least two separate feed conduits for the plasticized materials and at least two outflow passageways through which the core to be extrusion-coated can pass, and which are intended for the plasticized materials, the said outflow passageways being selectively connectable to the feed conduits via a distributor device.

2. Description of the Related Art

In such apparatus, it has been customary hitherto to provide between the feed conduits and the outflow passageways a cylinder arranged so as to be axially displaceable in a housing which receives the feed conduits and the outflow passageways or the extrusion heads, in which cylinder are arranged essentially mutually parallel conduits and intersecting conduits, via which the feed conduits are connectable selectively to the extrusion heads. At the same time, only half the number of conduits arranged in the cylinder ever receives a plasticized material, whereas the other half of the conduits is inoperative.

This results in the disadvantage that in the inoperative conduits the material remaining therein sets and clogs the conduits, so that they have to be cleaned laboriously, and this entails a very considerable outlay.

An object of the invention is to avoid this disadvantage and to provide apparatus of the type mentioned in the introduction, in which there is no need for cleaning after a change of color or of material.

SUMMARY OF THE INVENTION

According to the invention, that object is achieved because the distributor device is formed by a sleeve which is arranged rotatably between end positions in relation to an outer housing having the feed conduits for the plasticized materials. The distributor device has a number of feed conduits, corresponding to the number the feed materials to be extruded, of conduits providing communication between the outside of the sleeve and its inside or its end face. The feed conduits are connected alternately to the outflow passageways for the plasticized materials and terminate on the outside of the sleeve, but within the housing, in a manner mutually offset by the same angular spacing as the beginning points of the sleeve conduits.

This ensures that all the conduits of the distributor device always have plasticized material flowing through them, and therefore clogging of the conduits is no longer possible. Since the sleeve can be made relatively thin-walled, correspondingly small volumes for their conduits can also be obtained, with the result that in a change of color or of material only relatively small lengths of the finished product have to be cut out and are wasted.

In a development of the invention which is especially advantageous in terms of construction, the sleeve is connected firmly at least to the central body guiding the core to be extrusion-coated. There, the sleeve can also be connected to molding inserts in the region of the outflow die.

According to a further feature of the invention, in a change of color or of material where there is only a brief interruption in the flow of plasticized material, in order to prevent as far as possible any variation in the working conditions of the extruders supplying the extrusion-coating appliance, there can be arranged in the sleeve, conduits which in the region of intermediate positions of the sleeve between its end positions, connect the feed conduits to overflow conduits arranged in the housing.

Thus, during a change of color or of material, the stream of plasticized material can be maintained virtually constant, so that there is no need to regulate the extruders during the change of color or of material.

In order to simplify construction, it is possible, furthermore, for the sleeve or an insert connected to it to limit, at the same time, a throughflow passageway for one of the plasticized materials to be extruded.

In apparatus according to the invention for the sheathing of a core with layers of approximately equal thickness, according to a further feature of the invention the conduits arranged in the sleeve can be formed, in a way known per se, by grooves widening in a trumpet-like manner, which are arranged on the outside of the sleeve and, in their end regions are offset in the axial direction of the sleeve relative to their starts that are in communication with the feed conduits. The grooves extend over virtually the entire circumference of the sleeve, and, via recesses separated from one another by means of webs, they are connected to the inside of the sleeve or to a part inserted into the sleeve the grooves widening in mutually opposite directions. One of the grooves is connected to an outflow passageway limiting the inner layer thickness and located upstream, as seen in the direction of feed of the core to be extrusion-coated, and the other groove is connected to the outflow passageway located downstream.

The formation of grooves serving as connecting conduits is already known on extrusion heads for producing sheathings having spiral grooves (but not on extrusion heads in which there is no change of color or material) for the purpose of feeding a rotating extrusion head.

The proposed design of the conduits in the apparatus according to the invention makes it possible to achieve a substantially uniform flow of plasticized material over the circumference of the sleeve to the outflow passageways, through which passes the core to be extrusion-coated. Correspondingly homogenous sheathing layers are thereby also formed on the core. The widening of the grooves in mutually opposite directions affords the advantage of a highly compact design.

Apparatus according to the invention can also be used for the sheathing of a core with a relatively thick inner layer and with a thin outer layer surrounding the outer layer, or a stripe of another or differently colored material, in which the gap for the material forming the thin outer layer or the stripe is limited by the applied thicker inner layer. Two feed conduits for different or differently colored materials are provided for forming the thin outer layer or the stripe, one of which can be connected in each case to an annular space defined by the conical end face of a body guiding the core to be extrusion-coated and by a spaced molding piece of essentially similar shape, and a single feed conduit for the material forming the inner layer is provided. According to a further feature of the invention the sleeve can have a conduit which is formed by circumferentially positioned perforations in communication with a feed conduit and extending over at least some of the circumference of the sleeve and intended for the material forming the inner layer. The perforations open into a gap between the body guiding the core to be extrusion-coated, at a point upstream of its conical end face and the sleeve. A further conduit communicates with one of the two remaining feed conduits, and a still further conduit connects the other of the two further feed conduits with a gap arranged in the region of the conical end face of the body.

In this arrangement it is possible to cause all three conduits to run independently of a change of color or material for feeding the extrusion-coating apparatus, and the material flowing via a downstream feed conduit is admixed with that of the upstream conduit carring the material for providing the inner layer.

In apparatus according to the invention for the sheathing of a core with layers of approximately equal thickness and for applying a staipex marking, in which there are two additional feed conduits, one of which is connectable in each case to a gap opening into the outflow passageway located downstream, as seen in the direction of feed of the core to be extrusion-coated, it is possible, furthermore, for the sleeve also to have a conduit which is connectable to one of the two additional feed conduits and that opens into the conduit connected to the outflow passageway located upstream, and a further conduit which opens into the gap leading to the outflow passageway located downstream and which can be connected to one of the two additional feed conduits.

With such apparatus, both a change of color or of material in the two layers of the sheathing and the line marking are possible in a very simple way. For this, it is merely necessary to rotate the sleeve accordingly.

BRIEF DESCRIPTION OF THE DRAWINGS

The invention is now explained in detail by means of the drawings.

DESCRIPTION OF THE PREFERRED EMBODIMENT

Figure 1:
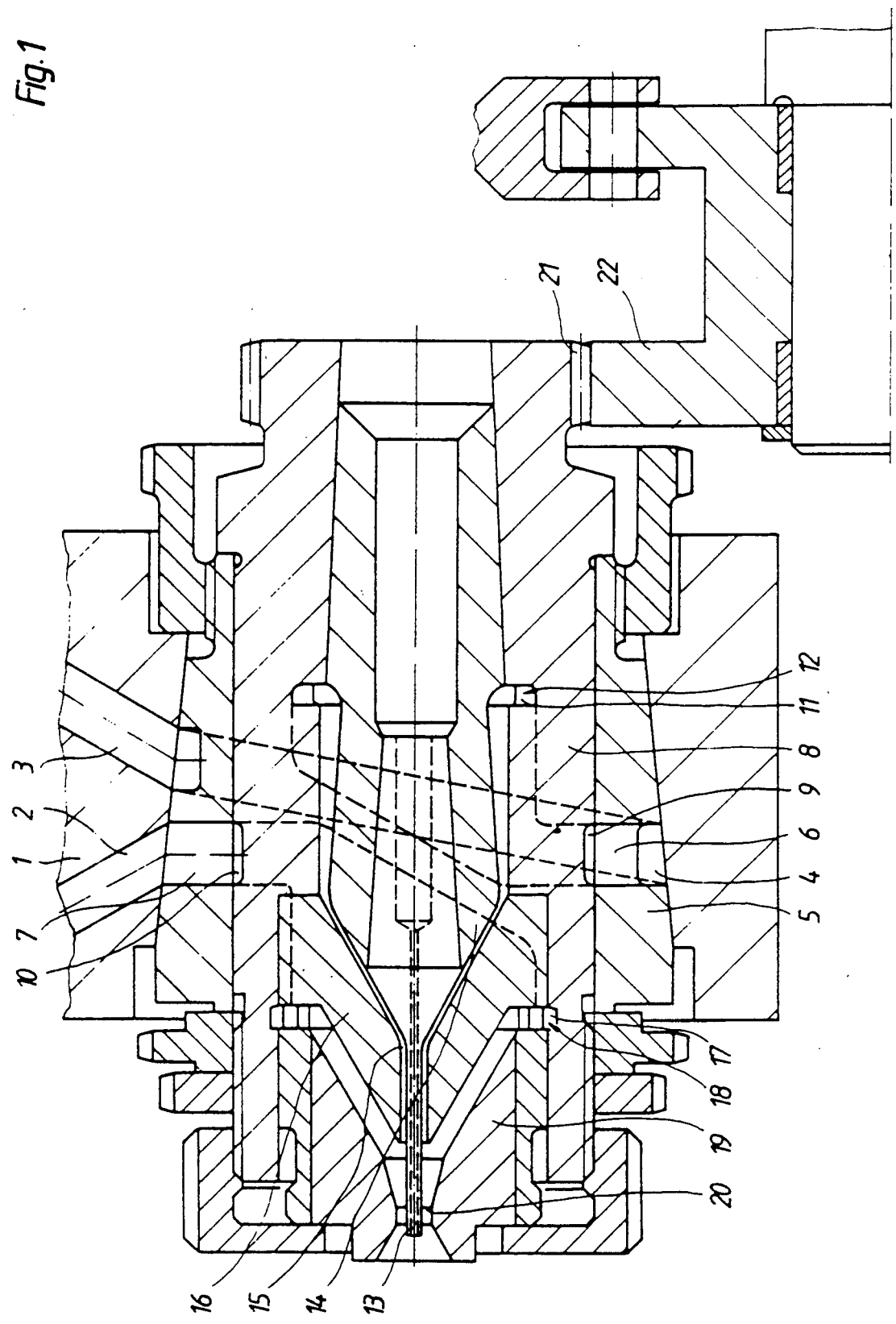
FIGS. 1 to 3 of the drawings show different embodiments of apparatus according to the invention.

The embodiment according to FIG. 1 allows a change of color or material in a two-layer sheathing.

In the housing 1, there are two feed conduits 2 and 3 for feeding the plasticized masses prepared in two extruders (not shown), the feed conduit 3 terminates in a housing groove 4 extending essentially over 180°, so that the ends of the feed conduits are located opposite one another. Retained in this housing 1 is a fixedly arranged sleeve 5 with a conical outer wall, which forms in practice part of the housing and which has on its outside wall the groove 4 as well as corresponding perforations 6 and 7 for connecting the feed conduits 2, 3 to a distributor device. Alternatively, this sleeve 5 could also be made in one piece with the housing 1.

The distributor device is formed by a sleeve 8 which is rotatably supported in the sleeve 5 and which is equipped with two grooves 9, 10 widening inwardly of the sleeve outer circumference in a trumpet-like manner. These grooves 9, 10 widen in a region offset axially relative to their starts and communicate with the perforations 6 and 7 of the fixed sleeve 5, the grooves 9, 10 widening in mutually opposite directions.

The groove 9 is connected via perforations 12 that are separated from one another by means of webs 11 and are distributed circumferentially to communicate with an annular space which is located between the outer wall of the body 14 guiding the core 13, for example a wire, and the inner wall of the sleeve 8. When the apparatus is in the position shown in FIG. 1, the material flowing via the feed conduit 3 can enter the annular space upstream of the conical end face of the body 14 and flows against the core 13 as an inner layer of material.

The outflow passageway 15 required for applying the inner layer is limited not only by the body 14, but also by a molding insert 16 which is inserted into the sleeve 8 and is connected to the latter. The inner wall of molding insert 16 is of an essentially converse design to the conical end face of the body 14.

The outer wall of molding insert 16 communicates with groove 10 of the sleeve 8 by means of perforations 17 distributed circumferentially in sleeve 8 and separated from one another by means of webs 18, so that the plasticized material flowing via the feed conduit 2 can penetrate into the annular gap formed by the conical end face of the outer wall of molding insert 16 and by the inner face of a further molding insert 19 of essentially converse conical design. The material from feed conduit 2 flows against the inner layer of material on the core 13 to provide an outer layer of material.

The shaping of the outer layer of material is carried out by means of the outflow passageway 20 defined by the molding insert 19.

The sleeve 8 is connected firmly to the body 14 and to the molding inserts 16 and 19, so that these parts are rotatable jointly with the sleeve.

For a change of color or material of the inner and outer layers of the sheathing of the core 13, it is merely necessary to rotate the sleeve 8 through 180°, for which purpose the latter is equipped with a toothed ring 21 which meshes with a drive pinion 22.

This ensures that plasticized material always flows through the conduits of the sleeve 8, which are formed by the grooves 9 and 10 and the perforations 12 and 17 in communication with them, since there are of course no further conduits permitting communication between the outflow passageways 15, 20 and the feed conduits.

However, this also reliably prevents the danger of clogging of such conduits after a change of color or material, and there is therefore no need for conduits to be cleaned after such a change.

Figure 2:
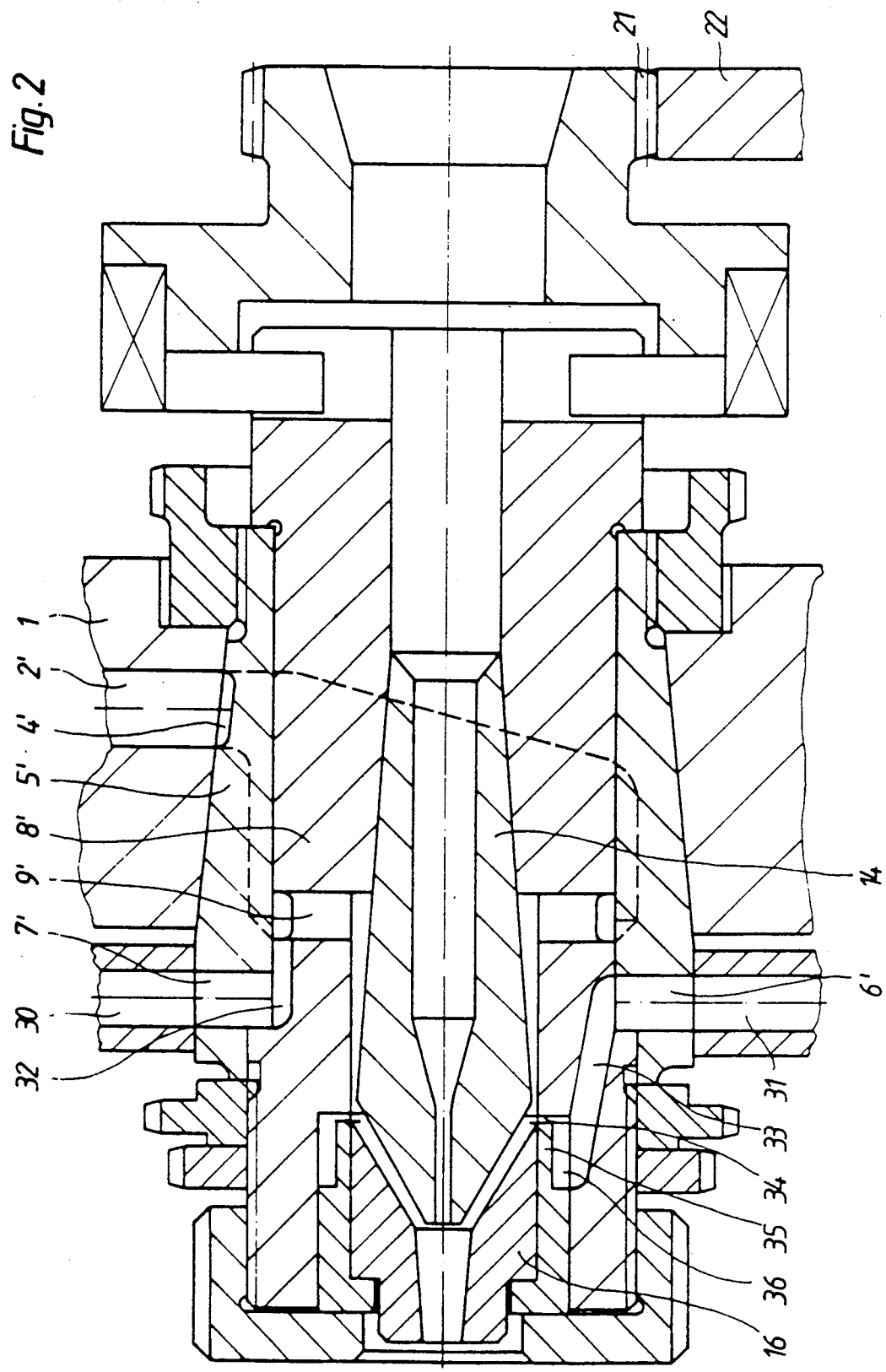

The embodiment according to FIG. 2 makes it possible to sheath a core 13 with a thick inner layer consisting of an essentially uniform material, and with a thin outer layer or a line marking of a different material or a differently colored material.

In the FIG. 2 embodiment, a feed conduit 2' is provided in housing 1 for the material that forms the inner thick layer of the sheathing.

Sleeve 5' is fixedly arranged in housing 1 and has a groove 4 which widens in a trumpet-like manner and is in communication with a conduit formed in rotatable sleeve 8', which is held rotatably in the fixed sleeve 5'. Perforations 9' distributed circumferentially in sleeve 8', irrespective of the position which the rotatable sleeve 8' assumes relative to the housing 1. These perforations 9' open into an annular space which is limited by the outer face of the body 14 and the inner face of the rotatable sleeve 8'. The perforations 9' open at a point upstream of the conical end face of the body 14.

A further conduit is formed by a groove 32 positioned on the outside of the movable sleeve 8' and communicates with perforations 9' of the movable sleeve 8'. Groove 32 is connectable to one of the further feed conduits 30, 31 provided for supplying the material for forming the thin outer layer or the line marking. Depending on the position of the movable sleeve 8', groove 32 connects either the feed conduit 30 or the feed conduit 31, which are both arranged diametrically opposite one another, to the conduit formed by the perforations 9'. Therefore, in the illustrated position of the movable sleeve 8', a mixing of the masses flowing up via the feed conduits 2' and 30 and consequently a coloring of the mass essentially forming the sheathing becomes possible.

Furthermore, a conduit formed by an oblique bore 33 is machined into the movable sleeve 8' and, depending on the position of the movable sleeve 8', connects one of the additional feed conduits 30, 31 to an annular space 36 which is limited by the inner wall of the movable sleeve 8' and a molding piece 35 inserted into it. Annular space 36 is connected, via a gap 34, to an annular space which is limited by the conical outer end face of the body 14 and the conical inner wall of the molding piece 16'. Further, molding piece 16' is inserted into the molding piece 35 and it includes a flow passageway through which the mass flowing in via the feed conduit 2' also flows. The material supplied via the feed conduit 31 in the position illustrated in FIG. 2 flows over the outer face of the cone of sheathing material also flowing through this annular gap and forms a thin skin on the ready-sheathed core 13, if, as shown in FIG. 2, the gap 34 is designed as a continuous gap. In contrast, if the gap 34 is designed as a limited perforation, the mass flowing up via the feed conduit 31 makes a line marking on the sheathing material.

In this embodiment, as in the embodiment of FIG. 1, the sleeve 8' is connected firmly to the body 14 and to the molding piece 35 and 16' for the purpose of joint rotatability.

Consequently, with this apparatus, in which, the movable sleeve 8' is equipped with a toothed ring 21 meshing with a drive pinion 22, the color or the material used for the outer layer, or a line marking, can be changed simply as a result of the rotation of the movable sleeve 8', permitting one of the materials supplied via the feed conduits 30, 31 to flow with the material supplied via the feed conduit 2'. The extruders (not shown) provided for feeding the feed conduits can thereby be operated at a constant conveying rate.

Figure 3:
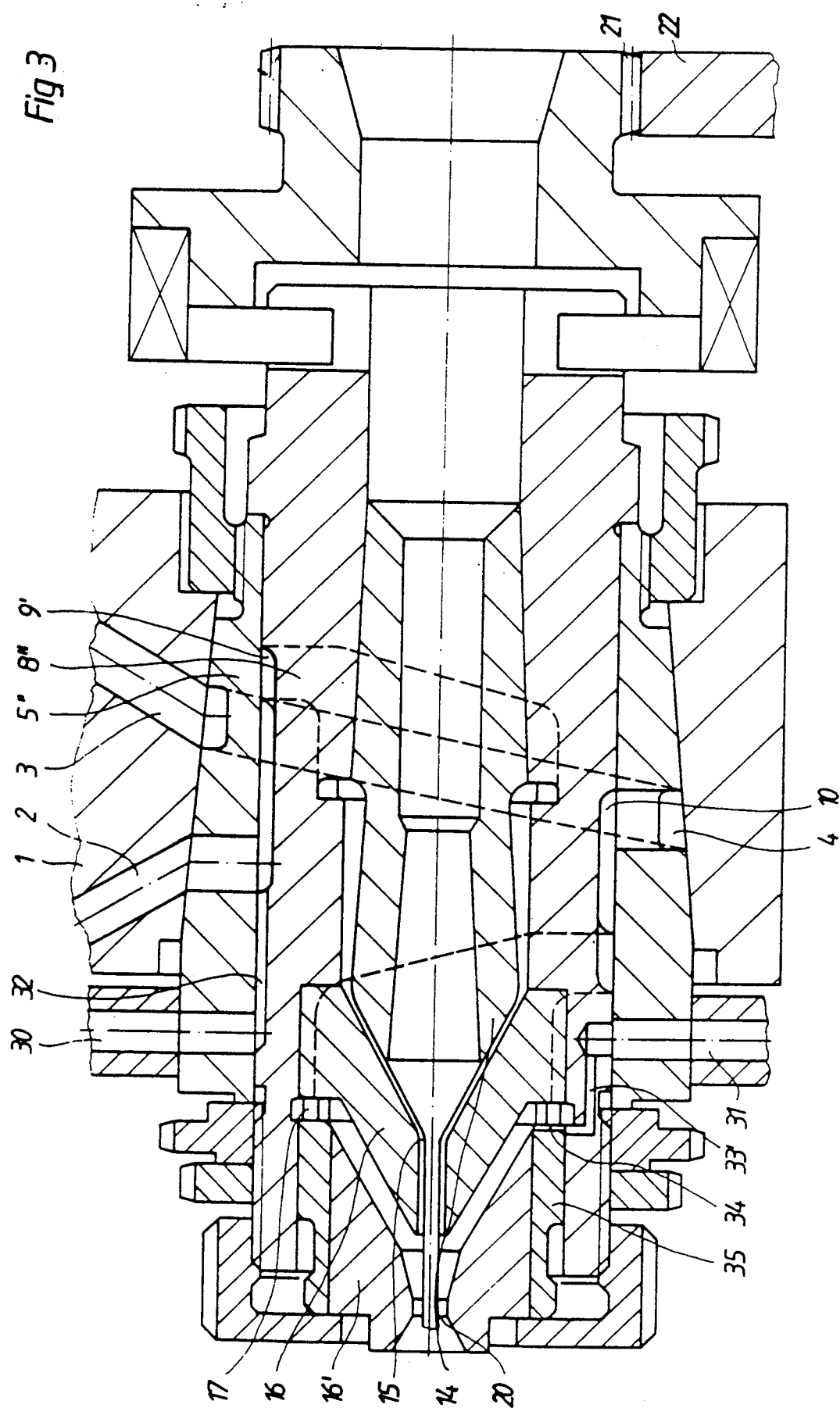

The embodiment according to FIG. 3 serves for .pplying a two-layer sheathing and a line marking, and both the materials or the colors of the two layers and of the line marking can be changed.

The embodiment according to FIG. 3 differs from that according to FIG. 1 only in that two further feed conduits 30, 31 are provided.

To connect these additional feed conduits 30, 31, in the movable sleeve 8'' there is a conduit which is formed by a groove 32 arranged on the outside of movable sleeve 8'' and which, in the illustrated position of the movable sleeve 8''', opens into the groove 9' of the movable sleeve 8''. The material flowing via the feed conduit 30 thereby flows with the material flowing via the feed conduit 2 and, as already explained with reference to FIG. 1, into the annular gap limited by the body 14 and the inner wall of the movable sleeve 8''', upstream of the conical end face of the body 14.

In the illustrated position of the movable sleeve 8''', the feed conduit 3 is connected via the groove 10 and the perforations 17 to the annular gap which is limited by the molding piece 16 inserted into the sleeve 8'' and by a further molding piece 16' having a conical inner face spaced from the conical outer face of molding piece 16, and which defines the outer layer of the sheathing material. For the feed conduit 31, there is in the movable sleeve 8'' a further conduit 33' which is formed by bores and which leads to a gap 34 leading into the annular space limited by the molding pieces 16, 16'. In this arrangement the material flowing through gap 34 in the illustrated position of the sleeve 8'' flows into against the outer surface of the cone of material passing through out flow cross section 5 and forms a line marking.

By appropriate rotation of the sleeve 8'', the feeding of the upstream annular space is exchanged for that of the downstream annular space, the conduit 33' and the molding piece 35 having the gap 34 also being rotated and put in communication with the feed conduit 30, so that a change in the feed for the line marking occurs.

I claim:

1. Apparatus for the extrusion coating of a core, such as an electrical conductor, with a sheathing having at least two layers or strips of different materials or differently colored materials, said apparatus comprising: a housing having a tubular wall and a longitudinal axis, at least two separate spaced feed conduits extending through the tubular wall into the housing for conveying plasticized materials, said housing having a circumferential groove extending around the periphery thereof, at least two substantially coaxial outflow passageways in the housing communicating with the feed conduits, through which passageways a core to be extrusion-coated passes and which passageways are for conveying the plasticized materials, the said outflow passageways being selectively connected to respective ones of the feed conduits by a distributor means, wherein the distributor means includes a tubular sleeve which is coaxial with and rotatably carried within the housing and which has a plurality of angularly spaced sleeve conduits extending transversely through the sleeve and corresponding in number to the number of housing conduits, the sleeve conduits providing communication between respective ones of the feed conduits and respective ones of the outflow passageways, so that when the sleeve is rotated from a first position to a second position the sleeve conduits provide communication between different ones of the feed conduits and the outflow passageways through a selective communication between said sleeve conduits and said circumferential groove, and drive means operatively connected with the sleeve for rotating the sleeve relative to the housing from a first angular position to a second angular position while flow of plasticized material is maintained to the sleeve conduits, to permit uninterrupted exchange of the plasticized materials between the feed conduits and the outlet passageways without stopping the flow of plasticized materials to the housing.

2. Apparatus as claimed in claim 1, wherein the distributor means includes a central body having a passageway for guiding the core to be extrusion-coated, and the central body is carried within and securely connected with the sleeve.

3. Apparatus as claimed in claim 1, wherein the sleeve conduits are circumferentially offset from each other by an angular distance corresponding with the angular spacing of the feed conduits.

4. Apparatus as claimed in claim 1, wherein the distributor means defines a throughflow cross-section for one of the plasticized materials to be extruded.

5. Apparatus as claimed in claim 1 for the sheathing of a core with layers of approximately equal thickness, wherein the sleeve includes a pair of axially spaced external grooves and the sleeve conduits communicate with respective ones of the grooves, wherein the grooves extend over substantially the entire circumference of the sleeve and include inwardly widening portions that have a varying axial width, wherein the sleeve includes inner recesses that are separated from one another by means of webs, and that communicate with respective ones of the outflow passageways, the grooves widening in mutually opposite circumferential directions, and one of which grooves communicates with a first outflow passageway defining the inner layer and located upstream, as seen in the direction of feed of material along the core to be extrusion-coated, and the other groove communicates with a second outflow passageway located downstream from the first outflow passageway.

6. Apparatus as claimed in claim 5, including two additional feed conduits, one of which is connectable in each case to a gap opening into the outflow passageway located downstream, as seen in the direction of the feed of material along the core to be extrusion-coated, wherein the sleeve includes an additional external groove that is in communication with one that also communicates with the two additional feed conduits and the conduit connected to the upstream outflow cross-section, and wherein the sleeve also includes a further conduit which communicates with the downstream outflow passageway and with the other of the two additional feed conduits.

7. Apparatus claimed in claim 1, wherein the drive means includes a toothed ring connected to the sleeve and a drive pinion that is in meshing engagement with the toothed ring for rotating the sleeve through a predetermined angle.

8. Apparatus claimed in claim 6, wherein the drive means includes a toothed ring connected to the sleeve and a drive pinion that is in meshing engagement with the toothed ring for rotating the sleeve through a predetermined angle.

9. Apparatus for the sheathing of a core with a relatively thick inner layer for providing a thin outer layer of predetermined circumferential extent, said apparatus comprising: a housing having a tubular wall and a longitudinal axis, at least two separate, angularly spaced feed conduits extending through the tubular wall into the housing for conveying plasticized materials, said housing having a circumferential groove extending around the periphery thereof, at least one outflow passageway in the housing communicating with the feed conduits, through which passageway a core to be extrusion-coated passes and which passageway is for conveying the plasticized materials, said outflow passageway being connected to respective ones of the feed conduits via a distributor means, wherein the distributor means includes a tubular sleeve which is coaxial with and rotatably carried within the housing and which has a plurality of angularly spaced sleeve conduits extending transversely through the sleeve and corresponding in number to the number of feed conduits for providing communication between respective ones of the feed conduits and the at least one outflow passageway through a selective communication between said sleeve conduits and said circumferential groove, so that when the sleeve is rotated from a first position to a second position the sleeve conduits provide communication between different ones of the feed conduits and the at least one outflow passageway, in which the materials forming the inner layer and the outer layer flow through a common outflow passageway and the flow area for the material forming the thin outer layer is limited by the thicker inner layer, and including a first feed conduit for conveying material for forming the thin outer layer, and second and third feed conduits for the material forming the inner layer are provided, wherein the sleeve includes a plurality of inwardly extending perforations distributed over the circumference of the sleeve which are in communication with the third feed conduit and are for the material forming the inner layer, and having an innermost end which opens into a gap between the interior of the sleeve and an inner body within the sleeve for guiding the core to be extrusion-coated, wherein the first and second feed conduits define openings in the housing that are axially spaced along the housing axis from an opening in the housing that is defined by the third feed conduit, and wherein the sleeve includes an inwardly extending passageway which connects one of the first and second feed conduits to a gap at a point downstream of the first and second conduits to form the outer coating layer, and drive means operatively connected with the sleeve for rotating the sleeve relative to the housing from a first angular position to a second angular position while flow of plasticized material is maintained to the sleeve conduits, to permit uninterrupted exchange of the plasticized materials between the feed conduits and the outlet passageways without stopping the flow of plasticized materials to the housing.

* * * * *